United States Patent [19]

Arvidsson

[11] Patent Number: 5,390,840
[45] Date of Patent: Feb. 21, 1995

[54] APPARATUS IN LOAD CARRIERS

[75] Inventor: Jan I. Arvidsson, Hillerstorp, Sweden

[73] Assignee: Industri AB Thule, Sweden

[21] Appl. No.: 752,477

[22] PCT Filed: Feb. 8, 1990

[86] PCT No.: PCT/SE90/00083
§ 371 Date: Sep. 6, 1991
§ 102(e) Date: Sep. 6, 1991

[87] PCT Pub. No.: WO90/10557
PCT Pub. Date: Sep. 20, 1990

[30] Foreign Application Priority Data

Mar. 8, 1989 [SE] Sweden ................. 8900814

[51] Int. Cl.⁶ ........................... B60R 9/12
[52] U.S. Cl. ................... 224/324; 224/315; 224/323
[58] Field of Search ........... 224/315, 319, 322, 323, 224/324, 330, 917

[56] References Cited

U.S. PATENT DOCUMENTS

| | | | |
|---|---|---|---|
| 3,848,785 | 11/1974 | Bott | 224/319 |
| 4,217,999 | 8/1980 | Forsman | 224/319 |
| 4,294,387 | 10/1981 | Wnek | 224/315 |
| 4,339,064 | 7/1982 | Ziaylek, Jr. | 224/324 |
| 4,456,158 | 6/1984 | Wertz et al. | 224/324 X |
| 4,496,089 | 1/1985 | Eklund | 224/322 X |
| 4,524,893 | 6/1985 | Cole | 224/319 |
| 4,629,104 | 12/1986 | Jacquet | |
| 4,817,838 | 4/1989 | Kamaya | 224/324 X |
| 4,867,362 | 9/1989 | Finnegan et al. | 224/315 X |
| 4,930,671 | 6/1990 | Tittle | 224/315 X |
| 5,054,673 | 10/1991 | Dixon | 224/319 X |

FOREIGN PATENT DOCUMENTS

| | | |
|---|---|---|
| 3137348 | 8/1982 | Germany . |
| 3321547 | 12/1984 | Germany ........... 224/315 |
| 3700885 | 3/1988 | Germany . |
| 3726299 | 2/1989 | Germany . |
| 430878 | 12/1983 | Sweden . |
| WO88/06987 | 9/1988 | WIPO . |

Primary Examiner—Allan N. Shoap
Assistant Examiner—Christopher McDonald
Attorney, Agent, or Firm—Burns, Doane, Swecker & Mathis

[57] ABSTRACT

A load carrier intended for vehicular use is provided with a strut fixed over the vehicle roof, on which at least one holder, such as a ski holder, is secured. The ski holder has a retainer stirrup which, in a closed position, encloses the strut and secures the ski holder thereon and which, in an open position, permits removal of the ski holder. The ski holder is further provided with a locking unit which, in the locked position, prevents removal of the skis. In order to permit simple mounting and dismounting of the ski holder on the strut, the retainer stirrup, itself, or with a first catch member secured thereon, extends, in the closed position of the retainer stirrup, into locking engagement with the locking unit or a second catch member secured thereon. In one embodiment, the locking unit is provided with a pivotal shank with the first catch member which cooperates with an interior locking heel on the second catch member which is pivotally secured in the locking unit and which is designed as a locking cap.

11 Claims, 4 Drawing Sheets

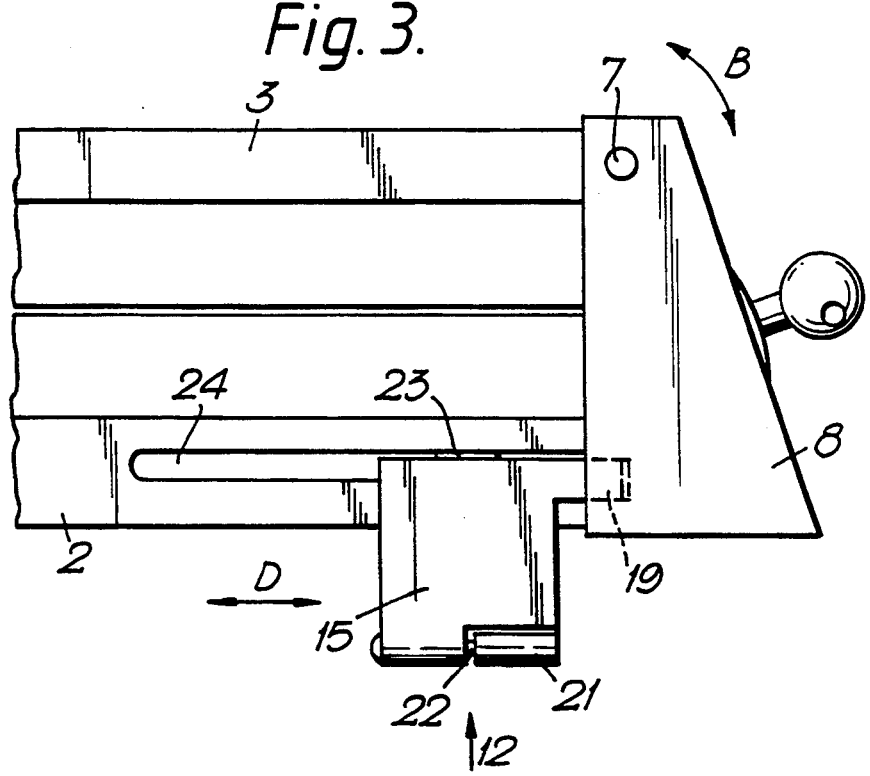
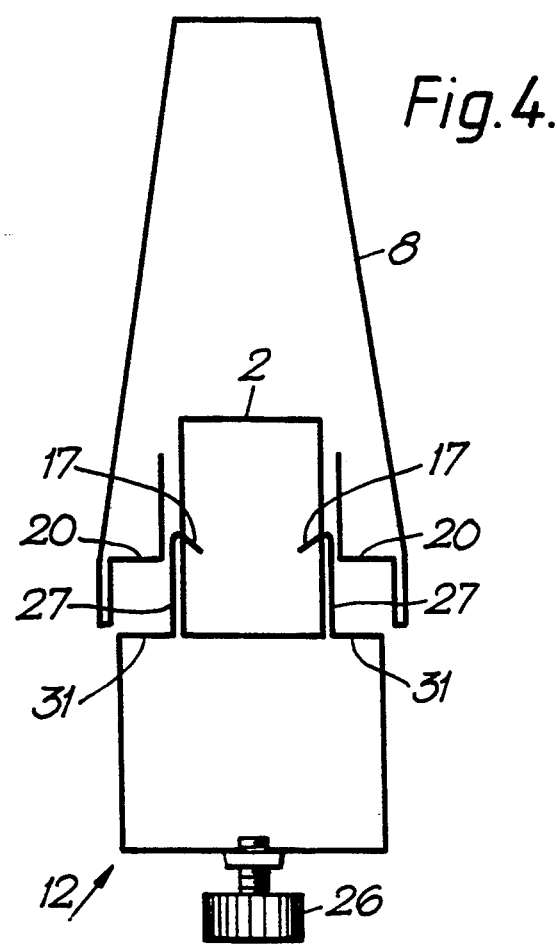

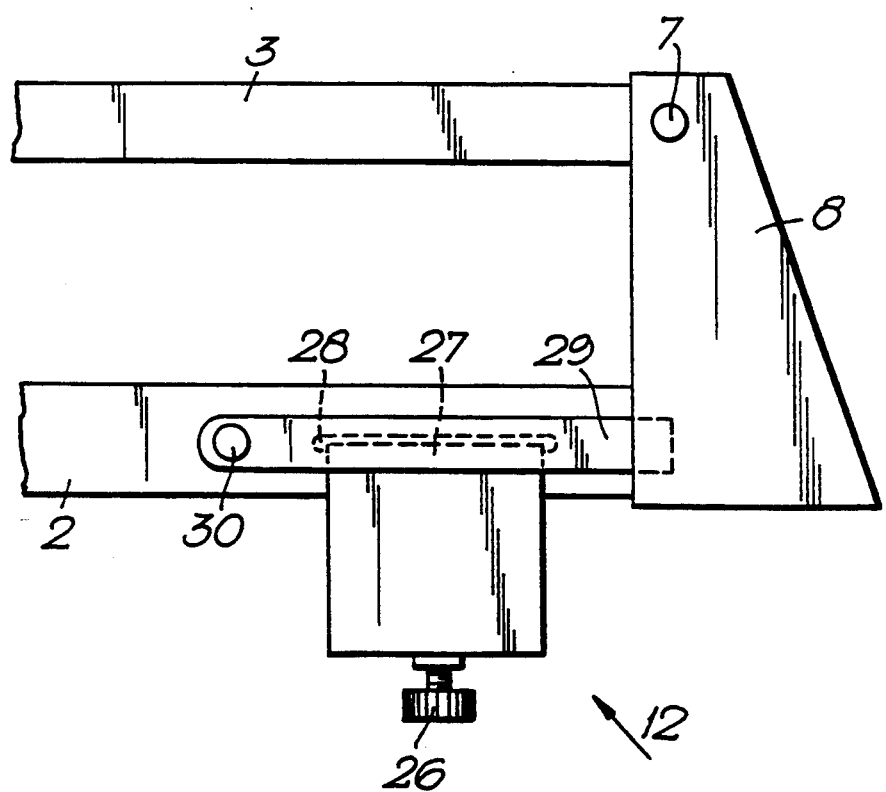

APPARATUS IN LOAD CARRIERS

TECHNICAL FIELD

The present invention relates to an apparatus in load carriers of the type which has a load carrier strut extending transversely across a vehicle roof, and on which at least one holder device designed for cooperation with the load is fixable, the holder device having an openable retainer element which, in a closed position encloses the carrier strut and secures the holder device thereon, and which, in an open position, permits removal of the holder device from the carrier strut, the apparatus including a movable locking portion which, in its locked position, prevents removal from the vehicle of a load carried on the load carrier.

BACKGROUND ART

Various models of load carriers of the type mentioned by way of introduction are previously known in this Art. These may, for example, be designed so as to transport, on a vehicle roof, skis, bicycles, windsurfing boards, optional elongate loads or other objects.

A load carrier which has holder devices specifically designed for the transport of skis will be discussed hereinbelow by way of non-restrictive typical example. Such a load carrier includes the above-mentioned carrier strut extending transversely across the vehicle roof and secured in the side edge areas of the vehicle roof by means of feet which, as a rule, are lockable on the vehicle. These feet are often provided with a movably disposed locking cap which is instrumental in or caters for the locking process of the foot on the vehicle. The holder device proper designed for fixedly retaining the skis has previously been provided with retainer elements which surround the load carrier strut and are permanently anchored in the holder device. This implies that, for mounting the ski holder, i.e. the holder device, on the carrier strut, it is necessary to remove at least one of the lockable feet before the ski holder with its retainer elements can be slid over the strut. This is perceived by users as being impractical and circumstantial.

Furthermore, a ski holder of the above-considered type is previously known in this Art, the holder having retainer elements designed as openable stirrups which, in the closed state, surround the carrier strut and which, in the open state, permit securement on or removal from the carrier strut of the ski holder without requiring the dismounting of any of the feet of the carrier strut. These retainer elements thus include a pivotal portion which is fixedly lockable in the ski holder proper with the aid of handwheels provided with locks.

This design of the holder device is also impractical in that at least one extra cylinder lock must be provided in addition to the lock which is employed for fixedly locking the skis in the ski holder and the lock which is employed for fixedly locking the foot on the vehicle. In such a case, there is an obvious risk of confusion or misplacement of all of the requisite keys.

PROBLEM STRUCTURE

The present invention has for its object to realise an apparatus of the type mentioned by way of introduction, the apparatus being designed in such a manner that the problems considered above are obviated. The present invention further has for its object to realise an apparatus which is more universally applicable than has been disclosed above for the ski holder under discussion. Furthermore, the present invention has for its object to realise an apparatus which is simple and economical in manufacture and which provides a safe and reliable locking effect.

SOLUTION

The objects forming the basis of the present invention are attained if the apparatus intimated by way of introduction is characterised in that the retainer element itself or a first catch member disposed thereon extends, in the closed position of the retainer element, into engagement with the locking portion or a second catch member connected therewith, which, in the first position of the locking portion, secures the retainer element in its locked position.

As a result of this design, it is possible for the second catch member disposed on the retainer element—and possibly the retainer element itself—to be designed either for cooperation with a movable locking portion on the holder device proper, or with one such locking device on that foot by means of which the carrier strut is secured on the vehicle. In both cases, no separate lock is required for easy securement of the holder device on the carrier strut.

One advantageous embodiment of the present invention is characterised in that the retainer element has a fixed portion which is secured in the holder device, and a portion which is pivotal in relation to the fixed portion by means of a hinge arrangement, the pivotal portion being provided with engagement members which, by pivoting of this portion, are movable into engagement with the holder device, and that the pivotal portion is provided with a projection which extends to the region of the locking portion designed as a movable locking cap on the holder device in order to be held by the locking portion in a locking position in which the engagement members engage with the holder device.

BRIEF DESCRIPTION OF THE ACCOMPANYING DRAWINGS

The nature of the present invention and its aspects will be more readily understood from the following brief description of the accompanying Drawings, and discussion relating thereto. In the accompanying Drawings:

FIG. 3 shows a partial view corresponding to FIG. 1 of an alternative embodiment of the ski holder;

FIG. 4 is an end elevation corresponding to FIG. 2 of a further alternative embodiment of a ski holder; and FIG. 5 shows a partial view corresponding to FIG. 1 of yet a further modified embodiment of the ski holder.

DESCRIPTION OF PREFERRED EMBODIMENT

Even though the present invention will be described hereinbelow in connection with a ski holder which is fixedly securable on a so-called roof rack which includes a carrier strut extending across a vehicle roof, it is self-evident that the same anchorage principle and locking principle may also be applied to other types of holder devices, such as holder devices intended for windsurfing boards, bicycles, elongate objects in general, load baskets and the like.

The complete apparatus according to the present invention includes a carrier strut which extends transversely across a vehicle roof and which is anchored in the side edge portions thereof by means of generally lockable feet. These feet may, for their locking purpose, include a movable locking device, a fixedly lockable security cap or the like. The holder device proper, hereinafter represented by a ski holder, is then secured in a suitable manner on the carrier strut and, for fixedly locking the skis in the ski holder, the ski holder is openable by means of a movable locking portion disposed at its one end, in this case a pivotal locking cap.

Figure 1:
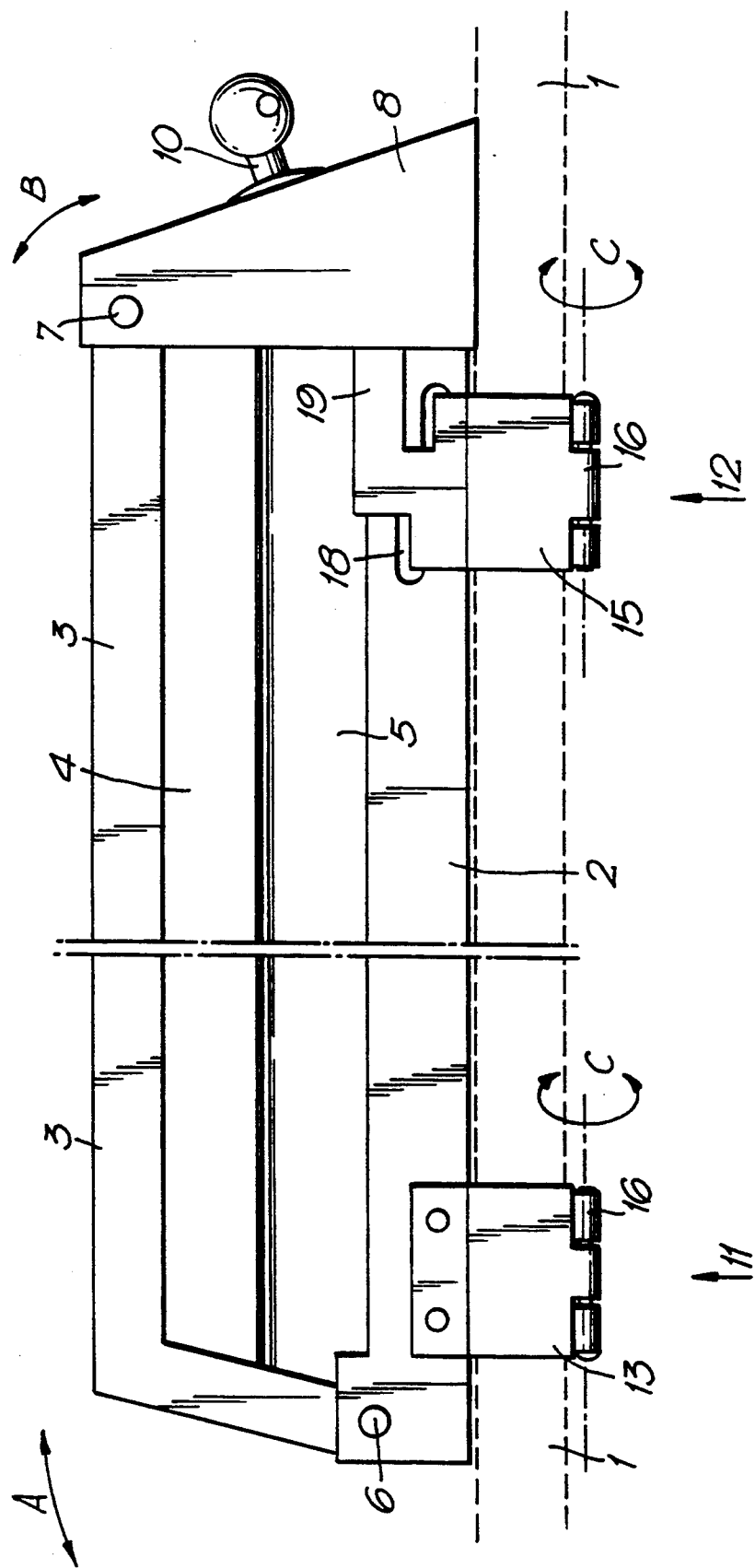
FIG. 1 is a side elevation of a holder device (ski holder) designed according to the present invention.

In FIG. 1, reference numeral 1 refers to the carrier strut (shown by broken lines) extending transversely across the vehicle roof. Furthermore, reference numerals 2 and 3 refer to the bottom rail and upper rail, respectively, of the ski holder, the upper rail 3 being, by means of a joint 6, pivotal according to the arrow A in relation to the bottom rail 2. In the upper rail 3, more precisely in its outer end which, when the ski holder is in use, is located out towards the side edge of the vehicle, there is disposed a joint 7 by means of which a locking cap 8 is pivotally secured according to the arrow B in relation to the upper rail 3. The upper rail 3 has an upper rubber bead 4, while the bottom rail 2 has a lower rubber bead 5, these rubber beads being employed to fixedly clamp therebetween the skis which are held by the ski holder.

On placing of the skis in the ski holder, the locking cap 8 is pressed in a downward direction, a catch (not shown) being released from a locking edge 9 (see FIG. 2), whereafter the locking cap 8 may be pivoted in a counter-clockwise direction according to the arrow B, and thereafter the upper rail 3 is pivoted in a counter-clockwise direction according to the arrow A. In this position, the skis may be both placed in the ski holder and removed therefrom. On closing of the ski holder, the upper rail 3 is first pivoted in a clockwise direction, whereafter the locking cap 8 is pivoted in the same direction, at the same time as the locking cap or the upper rail is pressed in a downward direction so that the catch may enter into engagement with the locking edge 9. In this position, the locking cap 8 may be fixedly locked in relation to the bottom rail 2 by means of a cylinder lock 10.

If there is to be any point in locking the skis in the ski holder, the ski holder itself must, of course, be securely mounted in the carrier strut 1 such that it cannot inadvertantly be removed therefrom. According to the present invention, the ski holder is provided on its bottom rail 2 with two retainer elements 11 and 12 which are switchable from a closed position where they enclose the carrier strut 1 and thereby fixedly retain the ski holder thereon. To improve this anchorage of the ski holder on the carrier strut, use may be made, in addition to the retainer elements 11 and 12, of clamping screws disposed in the lower defining walls of the retainer elements, or situated elsewhere, which are tightened towards the carrier strut 1 so that all clearance and rattling will thereby be eliminated. Such locking screws are illustrated in FIGS. 4 and 5.

The retainer elements 11 and 12 are also switchable to an open position in which they per se allow insertion of the carrier strut 1 so that, in the open position of the retainer elements, the ski holder may, in its entirety, be removed from the carrier strut 1 or mounted in place thereon.

Figure 2:
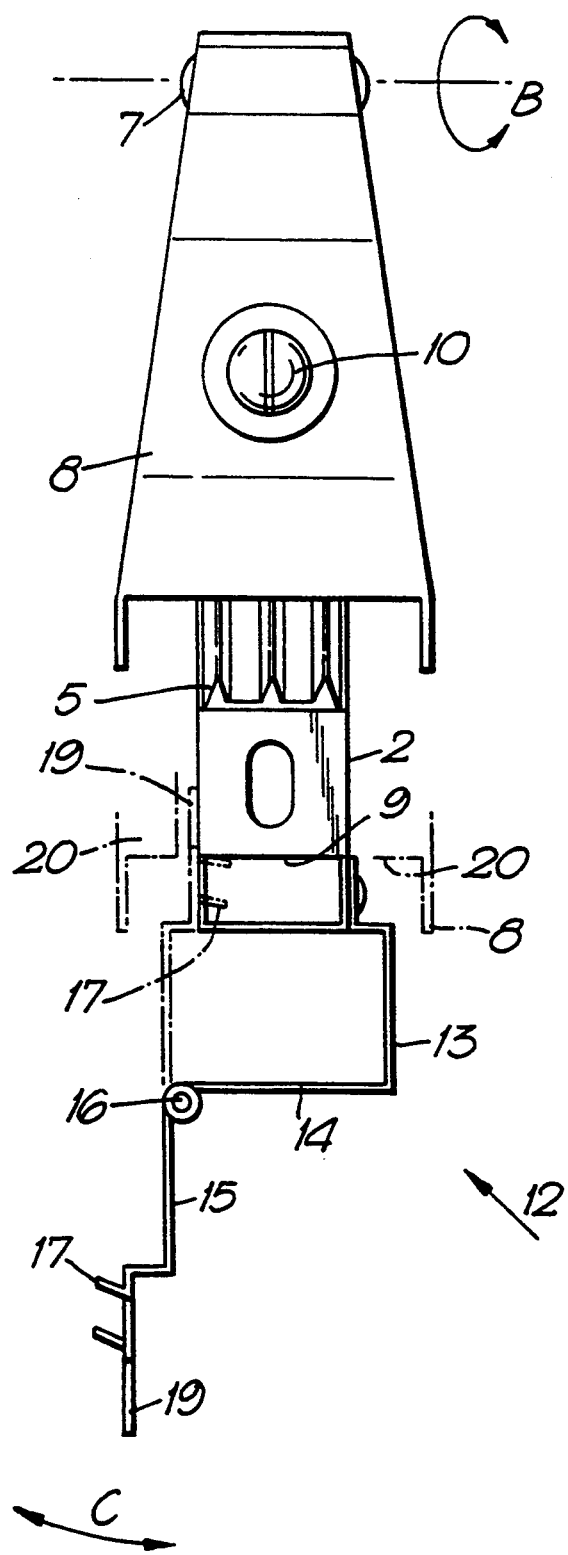
FIG. 2 is an end elevation (seen from the right in FIG. 1) of the ski holder according to FIG. 1.

In the embodiment according to FIGS. 1 and 2, the retainer elements consist of a fixed, angular stirrup with a side portion 13 and a bottom portion 14. This stirrup is secured in the bottom rail 2, for example by riveting or welding. In addition, each retainer element is provided with a further side portion 15 which, by the intermediary of a joint arrangement 16, is pivotally secured in the bottom portion 14. In FIG. 2, the retainer element 12 is shown in the open state and by solid lines, and in the closed state by broken lines. It will be apparent from this Drawing Figure that the side portion 15 has an extension with at least one, but preferably two projections 17 which, in the closed state of the retainer element, are insertable through apertures 18 in the side wall of the bottom rail 2. The projections 17 are designed so as to enter into engagement with an edge in the aperture 18 in order, by this engagement, to be fixedly secured in relation to the bottom portion 14 and the bottom rail 2. However, this engagement is no harder than pivoting of the side portion 15 can be effected by hand without the employment of any tools or aids when the screw 26 (not shown on these Figures) is not tightened.

It will further be apparent from FIG. 1 that the side portion 15 in its upper edge in FIG. 1 is provided with a fowardly directed arm 19 which serves the function of a catch member for locking the retainer element 12 in its locked position. The arm 19 extends laterally towards the end of the bottom rail 2 and extends in under the locking cap 8 in the locked position thereof (according to FIG. 1). As is apparent from FIG. 2, the locking cap 8 is interiorly provided with at least one engagement portion 20 directed at right angles to the plane of the Drawing in FIG. 1, the engagement portion being, in FIG. 2, parallel with the plane of the Drawing. This engagement portion 20 is, in the locked position of the locking cap 8, located in the region outside the catch member or arm 19 so that a pivoting of the side portion 15 and the catch member 19 disposed thereon in a counter-clockwise direction in FIG. 2 is prevented in that the catch member 19 comes into contact with the engagement portion 20 on the locking cap 8.

When the locking cap 8 is in the open position (FIG. 2 shows, by solid lines, a partly opened position), the catch member 19 is free from the engagement portion and consequently the side portion 15 may be pivoted according to the arrow C from the locked position illustrated by broken lines to the open position illustrated by solid lines. In this position, the carrier strut 1 accommodated interiorly in the retainer element 12 may, of course, be freely removed therefrom and, naturally, re-inserted if required.

In order to eliminate the risk that the ski holder be removed in its entirety from the carrier strut 1, it is sufficient to render one of the retainer elements 12 lockable. Consequently, the second retainer element 11 need not be provided with any counterpart to the catch member 19. It should, however, be pointed out that the side of the bottom rail 2 in FIG. 1 facing away from the observer is provided with apertures corresponding to the apertures 18 and that the counterpart to the side portion 15 in the retainer element 11 is also provided with projections corresponding to the projections 17 in FIG. 2. Since these projections are directed obliquely downwardly in the closed position of the retainer element 11, they will not be disengaged from the bottom rail as long as the locking screw preferably employed on the retainer element 11 in FIG. 1 is tightened.

DESCRIPTION OF ALTERNATIVE EMBODIMENTS

In certain cases, the foot which is employed for fixedly securing the carrier strut 1 may be provided with a movable locking portion such as a movable or pivotal security cap which has an open position in which the foot may be removed from the vehicle roof and a closed position in which the foot cannot be removed. In certain cases, it may be more expedient to cause the retainer element 12 to engage, with its catch member 19 or a counterpart hereto, with the locking cap of the foot instead of with a locking cap 8 possibly disposed on the ski holder. Hence, the present invention is not restricted to the embodiment illustrated in FIGS. 1 and 2, in which the ski holder is provided with a locking cap of the type illustrated on the Drawings. Naturally, the design and construction of the ski holder may also realise locking of its upper rail in a completely different manner. In particular in such cases when the holder device does not consist of a ski holder but may be intended for fixedly retaining other types of loads, the above-disclosed locking principle with engagement with the movable locking portion of the foot may be especially advantageous.

FIG. 3 illustrates an embodiment of the present invention which is somewhat modified in relation to that of FIG. 1. In this embodiment, the fundamental construction of the ski holder is identical to that described above with reference to FIGS. 1 and 2. The difference vis-a-vis the embodiment according to FIGS. 1 and 2 primarily resides in the fact that the side portion 15 is not pivotally connected to the bottom portion 14 of the retainer element 12. Instead, the bottom portion 14 is provided with an engagement sleeve 21 or other suitably designed engagement member which permits a connection between the bottom portion 14 and the side portion 15 by a displacement of the side portion 15 in the direction of the arrow D. Correspondingly, the side portion 15 is provided in its lower end with an engagement pin 22 or similarly designed engagement device for interconnecting with the bottom portion 14 as a result of the above-mentioned displacement movement.

In the embodiment according to FIG. 3, the side portion 15 may be permanently connected to the bottom rail 2 in that it is provided with counter-directed projections 23 extending into the interior of the bottom rail 2, the projections passing into the bottom rail through a slot-shaped opening 24. Hereby, the side portion 15 may, without risk of falling away from the bottom rail 2, be displaced according to the arrow D in the longitudinal direction of the slot 24. In its position shifted furthest left in FIG. 3, the ski holder may be placed over a load carrier strut and, by a turning movement, be located such that the bottom rail 2 becomes positioned directly above the carrier strut. In this position, the side portion 15 is shifted to the position shown on the Drawing so that the engagement members 21 and 22 engage with one another and interconnect the side portion 15 with the bottom portion 14. Analogous with the embodiment according to FIGS. 1 and 2, the side portion 15 is provided with a catch member 19 which extends into the region in beneath or behind the locking cap 8 and which may engage, with a deflected region, with the engagement portion 20 of the locking cap 8 so that release of the side portion 15 is hereby prevented.

FIG. 3 intimates by broken lines the deflected projection at the end of the catch member 19. In order that this does not prevent pivoting of the locking cap 8 in the direction of the arrow B when the ski holder is to be opened, the engagement portion 20 on the locking cap 8 should be provided with a recess which is located slightly above the deflected projection of the catch member 19 so that the previously mentioned pivoting of the locking cap 8 is possible when the locking cap is located in its depressed position.

In the embodiment according to FIG. 4, use is made of retainer elements 12 of a somewhat different type in that these are designed as flexible spring clamps 25. These spring clamps 25 are provided with the above-indicated locking screw 26 in their lower defining wall and are further provided with upwardly directed shanks 27 on either side of the side walls of the bottom rail 2. At the upper ends of the shanks 27, these are provided with inwardly directed projections 17 which extend through openings in the side walls of the bottom rail 2.

The material properties of the spring clamp 25 are such that this may be urged over the carrier strut 1 from beneath, whereafter its upwardly directed shanks 27 are placed one on either side of the bottom rail 2 so that the projections or catches 17 snap into their openings in the bottom rail 2, whereafter the screw 26 is tightened. In this position, the spring clamp will enclose the carrier strut and secure the ski holder thereon, in that the catches 17 are fixedly retained in the openings in the bottom rail 2.

To prevent unintentional removal of the shanks 27 and the catches 17 from the ski holder, the security cap 8 is, in analogy with the other embodiments according to the present invention, provided with engagement portions 20 which, in the locked position of the security cap 8, prevent disengagement of the catches 17 from their openings in the bottom rail 2 by engagement with the shanks 27.

In a modification of the embodiment according to FIG. 4, the retainer element 12 is designed with a considerably more rigid construction and has, in one of its corners, a joint arrangement corresponding to the joint arrangements 16 in the embodiment according to FIGS. 1 and 2.

In such cases when the retainer element 12 cannot be positioned so far out as partly to be covered by the locking cap 8, the constructional variation illustrated in FIG. 5 may be employed.

This embodiment differs from the embodiment according to FIG. 4 primarily in that the spring clamp 25 or the articulated clamp is placed further in than is the case in FIG. 4. It will be clearly apparent from FIG. 5 how the upper ends of the shanks 27 .extend with their catches in through openings 28 in the side walls of the bottom fall 2. To prevent release of the shanks 27 and their catches from the bottom rail 2, use is made of a pivotal locking arm 29 which, by means of a joint 30, is fixedly secured in the bottom rail 2. In its lowered position (shown in FIG. 5), the pivotal locking arm 29 covers both a portion of the shanks 27 and the openings 28 and thereby prevents the retainer elements 12 from being removed from the bottom rail 2.

The pivotal locking arm 29 is of such length as to extend into the region behind or inside the locking cap 8 and is also of such configuration at its end located there that, by engagement with the engagement portion 20 of the locking cap, it is prevented from being pivoted in the opening direction, i.e. in a counter-clockwise direction in FIG. 5. Pivoting in the opposite direction is prevented by engagement with the upper defining walls 31 (see FIG. 4) of the retainer element 12.

In a modification of the embodiment according to FIG. 5, use may be made of considerably longer pivotal locking arms 29, such that one and same locking arm may preferably be used for locking both of the retainer elements 11 and 12. If, in this case, the long locking arm 29 is of such vertical extent that it might, already when pivoting is commenced, come into engagement with skis fixedly clamped in the ski holder, the desired locking function will be achieved. As a possible variant of this construction, it is conceivable that the pivotal locking arm is of U-shaped cross-section and that, in its closed position, it embraces both the upwardly directed shanks 27 on the retainer elements 11 and 12 and the greater portion of the bottom rail 2. In this design, the locking arm is suitably secured in the joint 6 and, furthermore, the lower rubber bead 4 will not be secured to the bottom rail 2, but instead on the counterpart to the extended locking arm 29. This U-shaped and extended locking arm may possibly be provided, in the proximity of the joint 6, with a downwardly directed cam surface which, on clockwise pivoting of the locking arm to the locking position engages, through an opening in the lower wall of the bottom rail 2, with the carrier strut 1 and thereby achieves securing of the ski holder such that the screws 26 will be superfluous.

Such an extended U-shaped locking frame may be held in its locking position either by the skis secured in the ski holder or by the movable locking portion of the ski holder or the foot.

I claim:

1. An apparatus for use with load carriers of the type having a carrier strut extending transversely across a vehicle roof, comprising:
   a holder device including a holder portion for retaining a load in the holder device;
   means for locking the holder device, the locking means locking a load retained in the holder device in the holder device when the locking means is in a locked position;
   a retainer element attached to the holder device, the retainer element including a fixed portion fixed to the holder device and a first portion that is movable relative to the fixed portion between an open and a closed position, the retainer element, when the first portion is in the closed position, surrounding a carrier strut to secure the holder device on the carrier strut, the retainer element, when the first portion is in the open position, permitting removal of the holder device from the carrier strut, the first portion being secured in the closed position by the locking means by being at least partially covered by a portion of the locking means when the locking means is in the locked position.

2. An apparatus for use with load carriers of the type having a carrier strut extending transversely across a vehicle roof, comprising:
   a holder device including a holder portion for retaining a load in the holder device;
   means for locking the holder device such that a load retained in the holder device is locked in the holder device when the locking means are in a locked position;
   a retainer element attached to the holder device, the retainer element being movable between an open and a closed position and which, in the closed position, is adapted to surround a carrier strut to secure the holder device on the carrier strut and which, in the open position, permits removal of the holder device from the carrier strut, at least a portion of the retainer element being disposed relative to the locking means, when the retainer element is in the closed position, such that, when the locking means is in the locked position, the locking means secures the retainer element in the closed position,
   wherein the retainer element has a fixed portion fixed to the holder device, and a pivotal portion which is pivotal relative to the fixed portion, the pivotal portion being provided with at least one engagement members which are movable into engagement with the holder device, the pivotal portion having a portion forming a catch member, the catch member being locked in position by the locking means when the engagement members engage with the holder device and the locking means is in the locking position to secure the retainer element in the closed position.

3. A load carrier, comprising:
   a carrier bar extending transversely across a vehicle roof;
   at least one holder device including a first member and a second member pivotally connected to one another at a first end of each of the first and second members, the holder device further including a locking member movable to a locking position to lock a second end of the first member to a second end of the second member, the first and second members being adapted to retain a load between them when the second ends of the first and second members are locked together; and
   at least one retainer element including a fixed portion fixed to the holder device and a first portion that is movable relative to the fixed portion between a closed position in which the retainer element mounts the holder device on the carrier bar and an open position in which the retainer element allows removal of the holder device from the carrier bar, the first portion engaging with and being at least partially covered by the locking member to secure the retainer element on the carrier bar when the first portion is in the closed position and the locking member is in the locking position.

4. A load carrier according to claim 3, wherein the retainer element includes a catch member that is engaged by the locking member.

5. A load carrier, comprising:
   a carrier bar extending transversely across a vehicle roof;
   at least one holder device having a first and a second position, the holder device being adapted to hold a load in the first position and including a locking member having a locked position in which the holder device is locked in the first position, the locking member further having an unlocked position in which the holder device is adapted to be in the second position such that the load may be placed in or removed from the holder device; and
   at least one retainer element for mounting the holder device on the carrier bar, the retainer element including a fixed portion fixed to the holder device and a first portion that is movable relative to the fixed portion of the retainer element between an open position, in which the holder device is adapted to be mounted on or removed from the carrier bar, and a closed position, in which the retainer element mounts the holder device on the carrier bar, the first portion of the retainer element engaging with the locking member when the first portion of the retainer element is in the closed position and the locking member is in the locked position to secure the retainer element in the closed position such that the first portion of the retainer element is prevented from being moved to the open position.

6. A load carrier according to claim 5, wherein the retainer element includes a catch member that is engaged by the locking member.

7. A load carrier, comprising;

a carrier bar extending transversely across a vehicle roof;

at least One holder device having a first and a second position, the holder device being adapted to hold a load in the first position and including a locking member having a locked position in which the holder device is locked in the first position, the locking member. Further, having an unlocked position in which the holder device is adapted to be in the second position such that the load may be placed in or removed from the holder device; and at least one retainer element for mounting the holder device on the carrier bar, the retainer element being movable between an open position, in which the holder device is adapted to be mounted on or removed from the carrier bar, and a closed position, in which the retainer element mounts the holder device on the carrier bar, at least a portion of the retainer element engaging with the locking member when the retainer element is in the closed position and the locking member is in the locked position such that the retainer element is prevented from being moved to the open position, wherein the retainer element comprises a fixed portion fixed to the holder device and one pivotal portion hingedly connected to the fixed portion and pivotable between the closed position, in which a free end of the pivotal portion engages with the holder device, and the open position.

8. A load carrier according to claim 7, wherein the pivotal portion has, at the free end thereof, at least one engagement members for engaging corresponding members of the holder device.

9. A load carrier according to claim 7, wherein the pivotal portion has a catch member engagable with the locking member.

10. A load carrier, comprising:

a carrier bar extending transversely across a vehicle roof;

at least one holder device having a first and a second position, the holder device being adapted to hold a load in the first position and including a locking member having a locked position in which the holder device is locked in the first position, the locking member further having an unlocked position in which the holder device is adapted to be in the second position such that the load may be placed in or removed from the holder device; and at least one retainer element for mounting the holder device on the carrier bar, the retainer element being in the form of a U-shaped member having two shanks and a bottom adapted to receive the carrier bar, the shanks including, at free ends thereof engagement members adapted to engage and disengage with corresponding members in the holder device, the retainer element mounting the holder device on the carrier bar when the engagement members and the corresponding members are engaged, the locking member engaging a portion of the retainer element when the engagement members engage with the corresponding members and the locking member is in the locked position to secure the retainer element on the carrier bar such that the engagement members and the corresponding members are prevented from disengaging.

11. A load carrier comprising:

a carrier bar extending transversely across a vehicle roof;

at least one holder device having a first and a second position, the holder device being adapted to hold a load in the first position and including a locking member having a locked position in which the holder device is locked in the first position, the locking member further having an unlocked position in which the holder device is adapted to be in the second position such that the load may be placed in or removed from the holder device; and at least one retainer dement for mounting the holder device on the carrier bar, the retainer dement having one fixed portion fixed to the holder device and one movable portion slidingly connected to the holder device, the movable portion being movable between an open position in which the retainer element is adapted to permit the holder device to be mounted on or removed from the carrier bar and a closed position in which the movable portion engages the fixed portion such that the holder device is prevented from being removed from the carrier bar, the locking member engaging a portion of the retainer element when the movable portion is in the closed position and the locking member is in the locked position such that the movable portion is prevented from moving to the open position.

* * * * *